United States Patent
Hsiao et al.

(10) Patent No.: US 10,120,752 B2
(45) Date of Patent: Nov. 6, 2018

(54) DATA STORAGE DEVICE AND DATA ACCESS-METHOD

(71) Applicant: Silicon Motion, Inc., Jhubei, Hsinchu County (TW)

(72) Inventors: Li-Shuo Hsiao, Chiayi (TW); Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/675,817

(22) Filed: Aug. 14, 2017

(65) Prior Publication Data

US 2017/0344423 A1 Nov. 30, 2017

Related U.S. Application Data

(63) Continuation of application No. 14/547,412, filed on Nov. 19, 2014, now Pat. No. 9,766,974.

(30) Foreign Application Priority Data

Dec. 4, 2013 (TW) .............................. 102144357 A

(51) Int. Cl.
| | | |
|---|---|---|
| G11C 29/00 | (2006.01) |
| G06F 11/10 | (2006.01) |
| G06F 3/06 | (2006.01) |
| G06F 12/00 | (2006.01) |

(52) U.S. Cl.
CPC .......... *G06F 11/1068* (2013.01); *G06F 3/064* (2013.01); *G06F 3/0619* (2013.01); *G06F 3/0679* (2013.01); *G06F 11/1016* (2013.01); *G06F 12/00* (2013.01)

(58) Field of Classification Search
CPC ............. G06F 11/1068; G06F 11/1016; G06F 3/0619; G06F 3/064; G06F 3/0679
See application file for complete search history.

(56) References Cited

U.S. PATENT DOCUMENTS

| | | |
|---|---|---|
| 8,560,926 B2 | 10/2013 | Yeh |
| 9,021,218 B2 | 4/2015 | Yeh |
| 2008/0046630 A1* | 2/2008 | Lasser ................. G06F 13/1694 711/1 |
| 2008/0215802 A1* | 9/2008 | Chow ................. G06F 12/0246 711/103 |
| 2010/0088574 A1 | 4/2010 | Kim et al. |
| 2010/0313097 A1 | 12/2010 | Hicken |
| 2012/0203958 A1 | 8/2012 | Jones et al. |
| 2012/0215962 A1 | 8/2012 | Uhlaender |
| 2013/0227346 A1 | 8/2013 | Lee |

FOREIGN PATENT DOCUMENTS

| | | |
|---|---|---|
| TW | 201243590 A | 11/2012 |
| TW | 201305818 A | 2/2013 |

\* cited by examiner

*Primary Examiner* — Sam Rizk
(74) *Attorney, Agent, or Firm* — McClure, Qualey & Rodack, LLP

(57) ABSTRACT

The present invention provides a data-storage device including a flash memory and a controller. The flash memory includes a plurality of blocks, and each of the blocks has a plurality of pages, wherein each of the pages has a plurality of sub-pages and a plurality of spare areas, each of the spare areas is arranged to store a spare data sector, and the spare data sector respectively corresponds to the sub-pages. The controller is arranged to access the sub-pages according to the spare data sector.

10 Claims, 3 Drawing Sheets

DATA STORAGE DEVICE AND DATA ACCESS-METHOD

CROSS REFERENCE TO RELATED APPLICATIONS

This application is a Continuation application of pending U.S. application Ser. No. 14/547,412, filed on Nov. 19, 2014, which claims priority of Taiwan Patent Application No. 102144357, filed on Dec. 4, 2013, the entireties of which are incorporated by reference herein.

BACKGROUND OF THE INVENTION

Field of the Invention

The present invention relates to a data-storage device and in particular to a data-storage device capable of accessing pages.

Description of the Related Art

Flash memory is considered a non-volatile data-storage device, using electrical methods to erase and program itself. Taking NAND Flash as an example, it is often used in memory cards, USB flash devices, solid state devices, eMMCs and other memory devices.

The flash memory includes a plurality of blocks and each of the blocks has a plurality of pages arranged to store data. The flash memory is erased by block and stored by page. When the flash memory receives a command to erase all of the blocks, the flash memory will erase each of the pages of each of the blocks sequentially. When a part of the data stored in a page needs be updated, the flash memory has to retrieve all of the data stored in the page, integrate the updating data and the original data into integrated data, and write the integrated data into another physical page.

BRIEF SUMMARY OF THE INVENTION

A detailed description is given in the following embodiments with reference to the accompanying drawings.

The present invention provides a data-storage device including a flash memory and a controller. The flash memory includes a plurality of blocks, and each of the blocks has a plurality of pages, wherein each of the pages has a plurality of sub-pages and a plurality of spare areas, each of the spare areas is arranged to store a spare data sector, and the spare data sector respectively corresponds to the sub-pages. The controller is arranged to access the sub-pages according to the spare data sector.

The present invention further provides a data-accessing method applied to a data-storage device, wherein the data-storage device comprises a flash memory, the flash memory comprises a plurality of blocks, each of the blocks comprises a plurality of pages, and each of the pages comprises a plurality of sub-pages. The data-accessing method includes: receiving an access command arranged to access a first sub-page of the sub-pages, wherein each of the pages further comprises a plurality of spare areas, each of the spare areas is arranged to store a spare data sector, and the spare data sector respectively corresponds to the sub-pages. The method further includes accessing the first sub-page according to the spare data sector corresponding to the first sub-pages.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
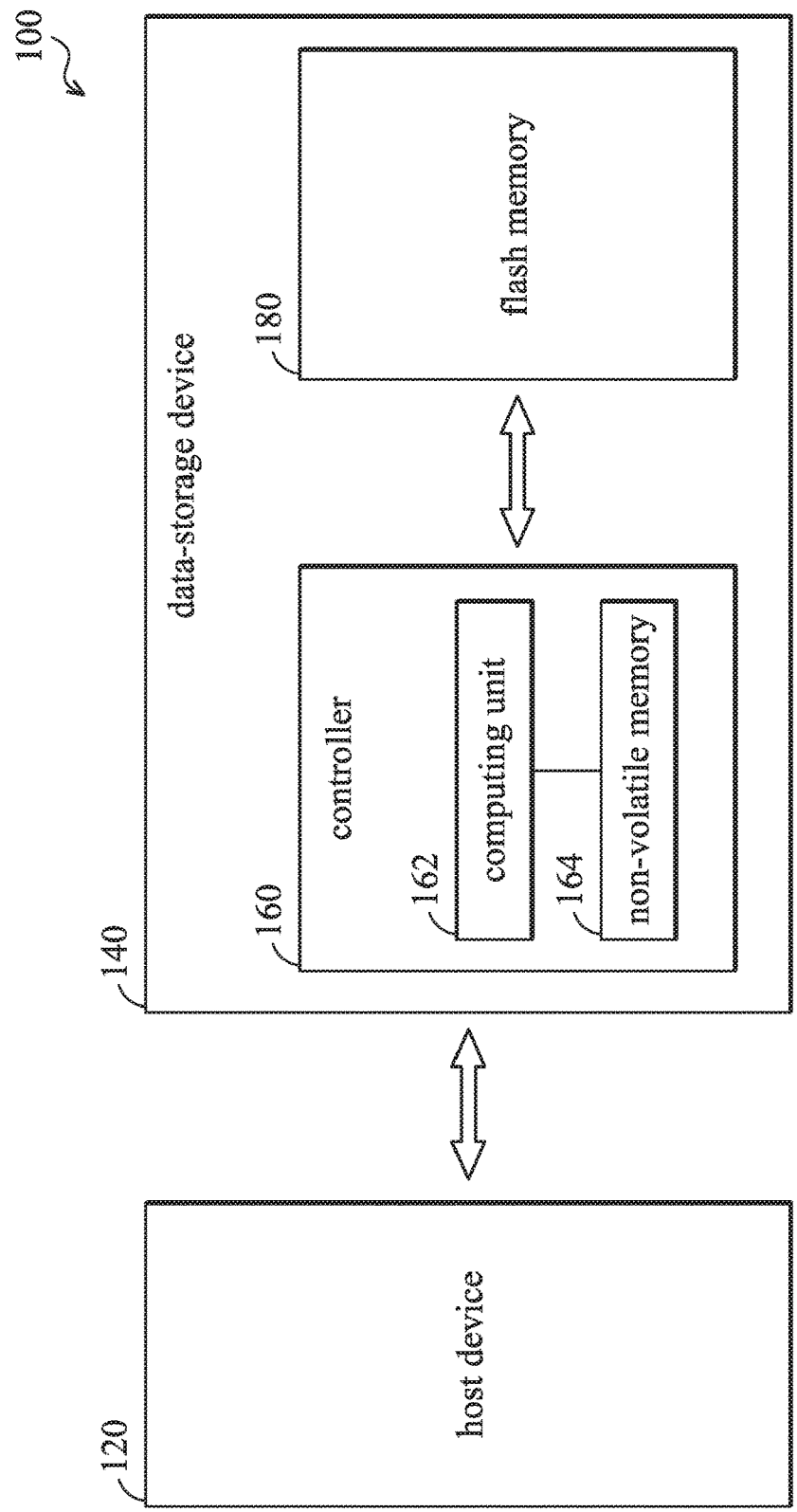
FIG. 1 is a schematic diagram illustrating an embodiment of an electronic system of the present invention.

FIG. 1 is a schematic diagram illustrating an embodiment of an electronic system of the present invention. The electronic system 100 includes a host 120 and a data-storage device 140. The data-storage device 140 includes a flash memory 180 and a controller 160 arranged to operate in response to the commands of the host 110. The controller 160 includes a processing unit 162 and a non-volatile memory, such as read only memory (ROM) 164. The non-volatile memory 164, the program code stored in the non-volatile memory 164 and data stored in the non-volatile memory 164 constitute firmware executed by the processing unit 162, and the controller 160 is configured to control the flash memory 180 based on the firmware. The flash memory 180 includes a plurality of blocks, and each of the blocks includes a plurality of pages. Moreover, each of the pages has a plurality of sub-pages and a plurality of spare areas. Each of the sub-pages includes a data area. In another embodiment, each of the sub-pages further includes an ECC parity corresponding to the data area. Each of the spare areas is arranged to store a spare data sector. The spare data sector respectively corresponds to the sub-pages. In one embodiment, the spare data sector includes a metadata of the corresponding sub-page, and the metadata is arranged to record the information of the corresponding sub-page. For example, the metadata may include the properties of data in the blocks, pages and sub-pages. The properties may include the mapping relationship of the physical sub-pages and the logical sub-pages, etc., but it is not limited thereto. In another embodiment, the spare data sector further includes an ECC parity of the corresponding metadata. Therefore, the controller 160 may access the sub-pages of the page according to the spare data sector. When each of the pages only has a spare area, the controller 160 is only able to access the data by units of pages, wherein when the controller 160 receives an access command to write a first sector of a first page, the controller 160 has to retrieve the data of the first sector and the data of the other sectors of the first page and store the integrated data into another page after integrating the data arranged to be written into the first sector and the original data of the other sectors. When each of the pages has a plurality of sub-pages and the corresponding spare areas, the controller 160 can directly write data into the sub-pages which is small than the pages, wherein when the controller 160 receives an access command to write a first sector of a first page and the first sector constitutes a sub-page, the controller 160 may write the data indicated by the access command directly into the sub-page indicated by the access command.

It should be noted that the flash memory 180 has at least one predetermined page arranged to store a page-size parameter, and the page-size parameter is arranged to represent the size of each of the pages. For example, each of the pages of the flash memory 180 has a predetermined size and the page-size parameters are stored into at least one predetermined page of the flash memory 180 after the data-storage device 140 is formatted, but it is not limited thereto. In another embodiment, the page-size parameter can be stored in the other memory devices of the electronic system 100, and the predetermined page may further include other information, such as the parameters corresponding to the size of the blocks, the parameters corresponding to the size of the sub-pages, etc., but it is not limited thereto. Moreover, the size of each page may be 4K, 8K or 16K, etc., but it is not limited thereto. The size of each sub-page may be 1K, 2K, 4K or 8K, etc., but it is not limited thereto. When the data-storage device 140 is powered on, the controller 160 reads the data of the predetermined page for obtaining the sizes of blocks, pages and sub-pages, and access the flash memory 180 based on different access modes.

For example, each of the subpages of the pages of the blocks has a logical address and a physical address, and the data-storage device 140 further includes a mapping table arranged to store the relationships of the logical addresses and the physical addresses of the sub-pages. For example, the mapping table may be stored in the non-volatile memory 164 or the flash memory 180, but it is not limited thereto. Moreover, the mapping table may further include at least one block mapping table, a plurality of page mapping tables and/or a plurality of sub-page mapping table. For example, the controller 160 may obtain the logical block and the logical sub-page according to a corresponding logical address, and look up the physical block corresponding to the logical block in the block mapping table to locate the physical block. Next, the controller 160 looks up the physical sub-page in the sub-page table corresponding to the logical block to obtain the physical sub-page, and locate the physical sub-page according to the logical sub-page, but it is not limited thereto. The methods to locate the physical address of the logical sub-page may be included in the scope of the present invention.

Figure 2A:
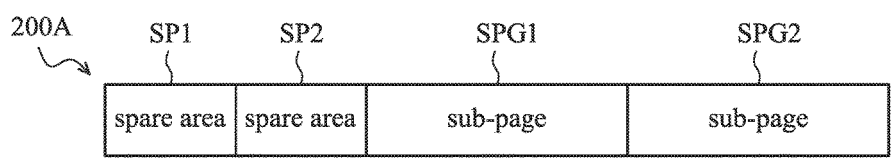
FIG. 2A is a schematic diagram illustrating an embodiment of a page of the present invention.

FIG. 2A is a schematic diagram illustrating an embodiment of a page of the present invention. In this embodiment, the size of the page 200A is 8K. The page 200A has two sub-pages SPG1-SPG2, the size of each sub-pages SPG1-SPG2 is 4K, but it is not limited thereto. The page 200A may further include four sub-pages with a size of 2K or eight sub-pages with a size of 1K. The size of the page 200A is not limited thereto. In this embodiment, the spare areas SP1-SP2 of the page 200A are arranged on the front of the page 200A, and the sub-pages SPG1-SPG2 are arranged in the back of the page 200A, wherein the spare area SP1 corresponds to the sub-page SPG1, and the spare area SP2 corresponds to the sub-page SPG2.

Figure 2B:
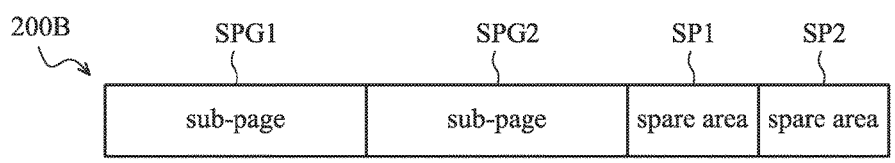
FIG. 2B is a schematic diagram illustrating another embodiment of a page of the present invention.

FIG. 2B is a schematic diagram illustrating another embodiment of a page of the present invention. In this embodiment, the size of the page 200B is 8K. The page 200B has two sub-pages SPG1-SPG2, and the size of the sub-pages SPG1-SPG2 is 4K, but it is not limited thereto. The page 200B may further include four sub-pages with a size of 2K or eight sub-pages with a size of 1K. The size of the page 200B is not limited thereto. In this embodiment, all of the spare areas SP1-SP2 of the page 200B are arranged in the back side of the page 200B, the sub-pages SPG1-SPG2 are arranged on the front of the page 200B, wherein the spare area SP1 corresponds to the sub-page SPG1, and the spare area SP2 corresponds to the sub-page SPG2.

Figure 2C:
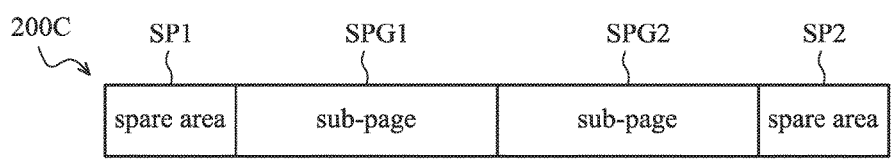
FIG. 2C is a schematic diagram illustrating another embodiment of a page of the present invention.

FIG. 2C is a schematic diagram illustrating another embodiment of a page of the present invention. In this embodiment, the size of the page 200C is 8K. The page 200C has two sub-pages SPG1-SPG2, and the size of the sub-pages SPG1-SPG2 is 4K, but it is not limited thereto. The page 200C may further include four sub-pages with a size of 2K or eight sub-pages with a size of 1K. The size of the page 200C is not limited thereto. In this embodiment, the pare areas SP1-SP2 of the page 200C are arranged on the front and in the back of the page 200C, and the sub-pages SPG1-SPG2 are arranged in the middle of the page 200B, wherein the spare area SP1 corresponds to the sub-page SPG1, and the spare area SP2 corresponds to the sub-page SPG2.

Figure 2D:
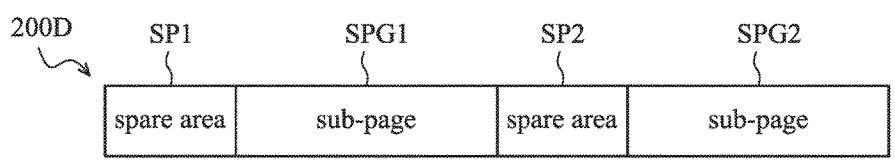
FIG. 2D is a schematic diagram illustrating another embodiment of a page of the present invention.

FIG. 2D is a schematic diagram illustrating another embodiment of a page of the present invention. In this embodiment, the size of the page 200C is 8K. The page 200D has two sub-pages SPG1-SPG2, and the size of the sub-pages SPG1-SPG2 is 4K, but it is not limited thereto. The page 200D may further include four sub-pages with a size of 2K or eight sub-pages with a size of 1K. The size of the page 200D is not limited thereto. In this embodiment, the spare areas SP1-SP2 and sub-pages SPG1-SPG2 are arranged in a staggered arrangement on page 200D, wherein the spare area SP1 corresponds to the sub-page SPG1, and spare area SP2 corresponds to the sub-page SPG2. It should be noted that, in this embodiment, the spare areas SP1-SP2 are arranged on the front of the sub-pages SPG1-SPG2, respectively. In another embodiment, the spare areas SP1-SP2 may be arranged in the back of the sub-pages SPG1-SPG2, respectively, but it is not limited thereto. Other arrangements of the spare areas and the sub-pages may be included in the scope of the present invention.

Figure 3:
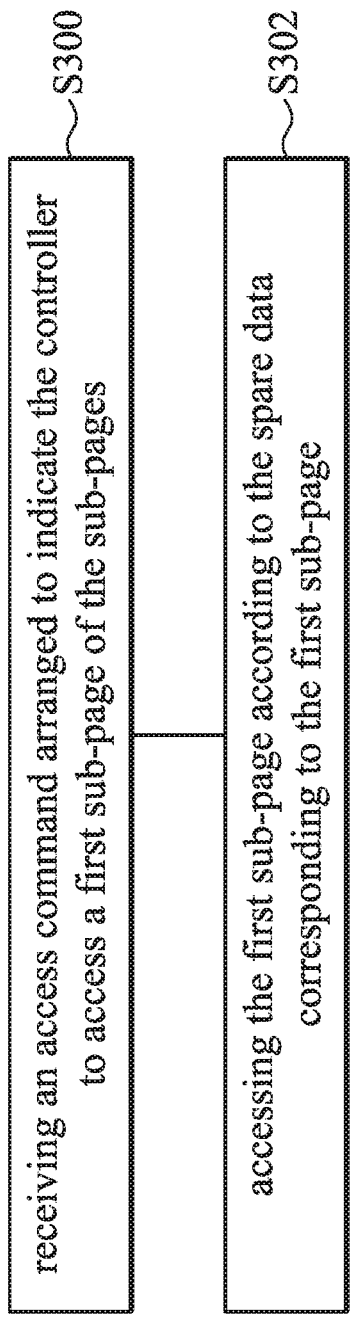
FIG. 3 is a flowchart of a data-accessing method according to an embodiment of the present invention.

FIG. 3 is a flowchart of a data-accessing method according to an embodiment of the present invention. The data-accessing method is applied to the electronic system 100 of FIG. 1. The process starts at step S300.

In step S300, the controller 160 receives an access command from the host device 120, wherein the access command is arranged to indicate the controller 160 to access a first sub-page of the sub-pages.

Next, in step S302, the controller 160 accesses the first sub-page according to the spare data sector corresponding to the first sub-page, wherein the step of accessing the first sub-page further includes correcting at least one error bit of the sub-pages according to the ECC parity, and correcting at least one error bit of the metadata according to the ECC parity. For example, the metadata may include the properties of data of the blocks, the pages and the sub-pages, such as the mapping relationship of the physical sub-pages and the logical sub-pages, etc., but it is not limited thereto. In another embodiment, the spare data sector further includes an ECC parity of the corresponding metadata. Therefore, the controller 160 may access the sub-pages of the page according to the spare data sector. When each of the pages only has a spare area, the controller 160 is only able to access the data by units of pages, wherein when the controller 160 receives an access command to write a first sector of a first page, the controller 160 has to retrieve the data of the first sector and the data of the other sectors of the first page and store the integrated data into another page after integrating the data arranged to be written into the first sector and the original data of the other sectors. When each of the pages has a plurality of sub-pages and the corresponding spare areas, the controller 160 can write data directly into the sub-pages which is smaller than the pages, wherein when the controller 160 receives an access command to write a first sector of a first page and the first sector constitutes a sub-page, the controller 160 may directly write the data indicated by the access command into the sub-page indicated by the access command.

For example, each of the subpages of the pages of the blocks has a logical address and a physical address, and the data-storage device 140 further includes a mapping table arranged to store the relationships of the logical addresses and the physical addresses of the sub-pages. For example, the mapping table may be stored in the non-volatile memory 164 or the flash memory 180, but it is not limited thereto. Moreover, the mapping table may further include at least one block mapping table, a plurality of page mapping tables and/or a plurality of sub-page mapping tables. For example, the controller 160 may obtain the logical block and the logical sub-page according to a corresponding logical address, and looks up the physical block corresponding to the logical block in the block mapping table to locate the physical block. Next, the controller 160 looks up the physical sub-page the sub-page table corresponding to the logical block to obtain the physical sub-page, and locate the physical sub-page according to the logical sub-page, but it is not limited thereto. The methods to locate the physical address of the logical sub-page may be included in the scope of the present invention.

The data-accessing method and the data-storage device 140 of the present invention may employ a reverse lookup to find the sector, which is smaller than the pages.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data-storage device, comprising:
   a flash memory, comprising a plurality of blocks, and each of the blocks has a plurality of pages, wherein each of the pages has a plurality of sub-pages and a plurality of spare areas, each of the spare areas is arranged to store a spare data sector, and each of the spare data sectors corresponds to one of the sub-pages; and
   a controller, arranged to access the sub-pages according to the spare data sectors,
   wherein the minimum access unit of the flash memory is the sub-page, each of the spare data sectors comprises a metadata arranged to record the information of the corresponding sub-page and an ECC parity of the metadata, and each of the sub-pages comprises a data area and an ECC parity of the data area, wherein the metadata includes properties of data in the blocks, wherein the properties include a mapping relationship of the physical sub-pages and the logical sub-pages,
   wherein when the controller receives an access command from a host to write a first sector of a first page of the plurality of pages and the first sector constitutes a sub-page, the controller write sector data indicated by the access command directly into the sub-page indicated by the access command.

2. The data-storage device as claimed in claim 1, wherein the flash memory further comprises at least one predetermined page, the predetermined page is arranged to store a page-size parameter, and the page-size parameter is arranged to represent the size of the corresponding page.

3. The data-storage device as claimed in claim 1, wherein the spare areas and the sub-pages are arranged in a staggered arrangement in the page.

4. The data-storage device as claimed in claim 1, wherein all of the spare areas of one of the pages are arranged on the front of the page or in the back of the page.

5. A data-accessing method, applied to a data-storage device, wherein the data-storage device comprises a flash memory, the flash memory comprises a plurality of blocks, each of the blocks comprises a plurality of pages, each of the pages comprises a plurality of sub-pages, and the data-accessing method comprises:
   receiving an access command arranged to access a first sub-page of the sub-pages, wherein each of the pages further comprises a plurality of spare areas, each of the spare areas is arranged to store a spare data sector, and each of the spare data sectors corresponds to one of the sub-pages; and
   accessing the first sub-page according to the spare data sector corresponding to the first sub-page, wherein the minimum access unit of the flash memory is the sub-page, each of the spare data sectors comprises a metadata arranged to record the information of the corresponding sub-page and an ECC parity of the metadata, and each of the sub-pages comprises a data area and an ECC parity of the data area, wherein the metadata includes properties of data in the blocks, wherein the properties include a mapping relationship of the physical sub-pages and the logical sub-pages; and
   when an access command is received from a host to write a first sector of a first page of the plurality of pages and the first sector constitutes a sub-page, writing sector data indicated by the access command directly into the sub-page indicated by the access command.

6. The data-accessing method as claimed in claim 5, wherein the step of accessing the first sub-page further comprises correcting at least one of error bit of the metadata according to the ECC parity.

7. The data-accessing method as claimed in claim 5, wherein the step of accessing the first sub-page further comprises correcting at least one error bit of the sub-pages according to the ECC parity.

8. The data-accessing method as claimed in claim 5, wherein the flash memory further comprises at least one predetermined page, the predetermined page is arranged to store a page-size parameter, and the page-size parameter is arranged to represent the size of the corresponding page.

9. The data-accessing method as claimed in claim 5, wherein the spare areas and the sub-pages are arranged in a staggered arrangement in the page.

10. The data-accessing method as claimed in claim 5, wherein all of the spare areas of one of the pages are arranged on the front of the page or in the back of the page.

* * * * *